United States Patent [19]

Petersen et al.

[11] Patent Number: 4,804,885
[45] Date of Patent: Feb. 14, 1989

[54] X-RAY ATTENUATING CERAMIC MATERIALS

[75] Inventors: Ronald O. Petersen, Banks; James L. McAlpin, Portland, both of Oreg.

[73] Assignee: Tektronix, Inc., Beaverton, Oreg.

[21] Appl. No.: 642,019

[22] Filed: Aug. 20, 1984

Related U.S. Application Data

[63] Continuation of Ser. No. 345,851, Feb. 4, 1982, abandoned.

[51] Int. Cl.$^4$ .................. H01J 31/00; H04N 5/65; G21K 1/00
[52] U.S. Cl. .................. 313/480; 250/515.1; 250/518.1; 252/478; 252/629; 313/477 R; 313/479; 358/247; 378/161; 445/22; 501/62; 501/63; 501/64; 501/72; 501/74; 501/152; 501/153; 501/154
[58] Field of Search .................. 313/477 R, 480, 479, 313/468; 378/51, 70, 156, 161, 158; 445/22; 252/478; 250/506.1, 515.1, 518.1; 358/247; 501/60, 62, 63, 64, 69, 72, 73, 74, 102, 103, 104, 108, 152, 153, 154

[56] References Cited

U.S. PATENT DOCUMENTS

| | | | |
|---|---|---|---|
| 2,912,340 | 11/1959 | Pincus | 106/62 |
| 2,934,667 | 4/1960 | Pincus | 313/131 |
| 2,962,136 | 11/1960 | Pincus | 189/36.5 |
| 3,060,040 | 10/1962 | Bristow | 106/46 |
| 3,207,936 | 9/1965 | Wilbanks et al. | 313/75 |
| 3,464,932 | 9/1969 | Connelly et al. | 252/478 |
| 3,543,073 | 11/1970 | Sheldon | 313/92 |
| 3,610,994 | 10/1971 | Sheldon | 313/92 |
| 3,663,246 | 5/1972 | LaGrouw | 106/53 |
| 3,794,502 | 2/1974 | LaGrouw et al. | 106/52 |
| 3,808,154 | 4/1974 | Omori | 252/478 |
| 3,907,584 | 9/1975 | Wada | 252/478 |
| 3,987,330 | 10/1976 | Shell | 252/478 |
| 4,065,696 | 12/1977 | Steierman | 313/480 |
| 4,065,697 | 12/1977 | Steierman | 252/478 |
| 4,130,775 | 12/1978 | Perkins et al. | 313/397 |
| 4,142,128 | 2/1979 | Odenthal | 313/429 |
| 4,174,490 | 11/1979 | Van Erck et al. | 313/480 |
| 4,277,286 | 7/1981 | Boyd et al. | 252/478 |
| 4,342,943 | 8/1982 | Weaver | 313/479 |
| 4,350,532 | 9/1982 | Randklev | 106/30 |
| 4,358,549 | 11/1982 | Randklev | 523/117 |
| 4,521,524 | 6/1985 | Yamashita | 313/480 |

FOREIGN PATENT DOCUMENTS

| | | | |
|---|---|---|---|
| 2235125 | 2/1972 | Fed. Rep. of Germany | 252/478 |
| 2504153 | 8/1975 | Fed. Rep. of Germany | 252/478 |
| 0811872 | 4/1959 | United Kingdom | 252/478 |
| 1250425 | 10/1971 | United Kingdom | . |
| 1397312 | 6/1975 | United Kingdom | . |
| 2057422 | 9/1979 | United Kingdom | . |

OTHER PUBLICATIONS

Sun, et al., "X-Ray Absorbing and Transmitting Glasses", *The Glass Industry*, pp. 686–691, 714, 716 (Dec. 1948).

*Primary Examiner*—Howard J. Locker
*Attorney, Agent, or Firm*—John D. Winkelman; Richard J. Polley

[57] ABSTRACT

X-ray attenuating ceramic materials having at least one substance selected from the group including compounds of strontium, zirconium, yttrium, niobium, molybdenum, neodymium and tungsten are disclosed. A zinc compound can be used for fluxing and X-ray attenuation in certain ceramic materials. The materials can be formed into strong, non-porous bodies such as cathode ray tube funnels. Such materials include forsteritic porcelains manufactured from batches containing strontium zirconate. Other X-ray attenuating ceramics contain a mixture of X-ray attenuating substances, including a compound of barium.

5 Claims, 1 Drawing Sheet

X-RAY ATTENUATING CERAMIC MATERIALS

This is a continuation of application Ser. No. 345,851, filed Feb. 4, 1982, now abandoned.

SUMMARY OF THE INVENTION

The present invention relates to the use of ceramic materials in the manufacture of electronic components, such as funnel structures for electron beam display devices. More specifically, it relates to the formation of ceramic materials, particularly forsteritic porcelains, capable of absorbing X-radiation.

When high speed electrons strike a body, such as a wall of a cathode ray tube envelope, X-rays are emitted. Thus, it is a standard practice to shield high voltage cathode ray tubes for the protection of persons in the vicinity of devices such as color televisions and certain oscilloscopes. If shielding were not used, such persons might be exposed to injurious amounts of X-radiation.

The most commonly used shields employ a sheet of an X-ray attenuating metal, such as lead, mounted to surround the cathode ray tube. But, such a shielding material is costly and increases the complexity of CRT devices and their manufacture. Furthermore, it is difficult to manufacture metal shields having seams that entirely prevent the leakage of radiation.

To eliminate the need for metal shielding, cathode ray tube envelopes can be made of special glass formulations which inhibit X-ray penetration. U.S. Pat. Nos. 3,464,932, 3,663,246, 3,794,502, 4,065,696, 4,065,697 and 4,174,490 disclose particular glass compositions which are absorptive of X-radiation. Likewise, United Kingdom patents Nos. 1,250,425, and 1,397,312 and published patent application No. 2,057,422A describe X-ray attenuating glass compositions. X-ray attenuating glasses are discussed generally in Larua L. Sun and Kuan-Han Sun, "X-Ray Absorbing and Transmitting Glasses", The Glass Industry, December 1948, beginning at page 686.

As described in the above-listed references, each X-ray attenuating glass composition includes a particular substance which is absorptive of X-radiation. Most of the above patents describe cathode ray tube faceplates made of glass compositions that contain PbO for X-ray attenuation. Cathode ray tube funnels have also been made from X-ray attenuating glass containing PbO.

Other glass compositions used to form cathode ray tube components have included SrO, $Y_2O_3$ or $ZrO_2$ for the purpose of X-ray attenuation. But, glass compositions that employ X-ray attenuating substances other than PbO usually have high melting temperatures. It is impractical to use a high melting temperature glass when building cathode ray tube components. Furthermore, if a glass-making batch contains a sufficient amount of SrO or $ZrO_2$ to achieve good X-ray attenuation, the resulting glass will tend to be devitrified and have poor forming properties.

Even the X-ray attenuating glass compositions which have good properties are of somewhat limited utility. This is because it is inherently disadvantageous to manufacture any electronic component from a body of glass, unless great quantities of the component are to be manufactured. High temperature furnaces and complex tooling are necessary to form glass bodies such as funnels for cathode ray tubes. These requirements make it impossible to economically produce glass components, except on a very large scale.

If a particular cathode ray tube funnel is desired in limited quantities, the cost of tooling and manufacturing a glass body would be prohibitive. A suitable funnel can, however, be manufactured from a ceramic material using simpler and less expensive tooling. Because equivalent ceramic materials can have lower firing temperatures than those required for glass compositions, smaller furnaces can be used and less energy consumed for firing.

A ceramic cathode ray tube funnel may be used with a glass faceplate if both components have a similar thermal coefficient of expansion. Such a composite cathode ray tube and method for its construction are shown in U.S. Pat. No. 3,207,936, H. Wilbanks, et al., which is incorporated herein by reference. The cathode ray tube shown in the Wilbanks patent employs a glass faceplate and neck piece that are frit-sealed to a ceramic funnel. It is relatively easy to manufacture such a composite tube. And, low volume production runs of special purpose cathode ray tubes are feasible when a ceramic funnel is used in such a composite structure.

Some ceramic cathode ray tube funnels are presently manufactured from forsteritic porcelain materials of the type described in the Wilbanks patent at column 5, lines 18-26. Although such funnels have good mechanical characteristics, they are virtually transparent to X-radiation. It has thus been necessary to use external shielding of lead or some other material when a high voltage cathode ray tube has such a ceramic funnel.

As previously mentioned, external X-ray shielding is not required if a cathode ray tube is made of a glass that includes certain X-ray attenuating substances, such as PbO. But, the X-ray attenuating substances used in glass have never been included in ceramic formulations in amounts sufficient to produce a ceramic body that attenuates a sufficient amount of X-radiation.

Small amounts of BaO have been included in forsteritic porcelain materials as described in U.S. Pat. Nos. 2,912,340 and 2,962,136, both of A. G. Pincus. However, there has been no recognition that a ceramic with BaO absorbs X-radiation. And, such materials have not been used to form electrical components, such as cathode ray tube funnels, for which X-ray attenuation would be a useful property.

Cathode ray tube funnels have been manufactured from forsteritic porcelains that include ZnO as a fluxing agent in amounts below six wt. percent. But, tubes made from such funnels require lead shielding since the forsteritic porcelain does not attenuate X-radiation effectively.

Perhaps the reason why there has never been a ceramic cathode ray tube funnel suitable for unshielded use is the difficulty of devising a usable ceramic formulation. Any significant addition to a known ceramic-making batch will cause a change in the physical properties of the resulting ceramic body. In some instances, particularly if PbO were included for X-ray attenuation, the resulting changes would be quite detrimental. And, manufacturing problems would be expected to occur.

For example, one would expect a change in thermal expansion coefficients if ceramic bodies were produced from a known batch to which an X-ray attenuating substance was added. If the bodies are cathode ray tube funnels, a sufficient shift in the coefficient would cause the funnels to be incompatible with standard CRT faceplate glass.

Another difficulty is that additions of X-ray attenuating substances can alter the fusion properties of a ceramic material, by moving its firing temperature to an unacceptable level. The effect on firing temperature can also make it difficult to form a ceramic body of a desired shape. Specifically, a ceramic body is formed by pressing a particulate batch into a mold of a desired shape and firing the molded object in a kiln. During firing, the object must not shrink or soften extensively if the body is to retain its shape. Softening would be expected if ceramic material contained an X-ray attenuating substance, such as PbO, that is a glass-fomer. If present, such a substance would tend to flux and melt a ceramic composition so that slumping would occur during firing.

Some X-ray attenuating substances, such as PbO, readily volatilize. If a volatilizable substance such as PbO were included in a ceramic-making batch, one would expect increased slumping problems and excessive shrinkage due to the loss of volatile materials during firing.

Furthermore, if volatilizable substances such as PbO are used, gases released during firing pose a health hazard to workers and contaminate the refractories of the firing kiln.

It is now discovered that certain ceramic materials effectively attenuate X-radiation and yet avoid the problems discussed above. Bodies of such ceramic materials have good mechanical and electrical properties after firing and can be formed without undue difficulty.

A most excellent ceramic is a forsteritic porcelain having as an essential ingredient, a compound of strontium, yttrium, zirconium or niobium or a mixture of such compounds. Preferably, the porcelain includes no lead, but not more than five wt. percent PbO in any event. Bodies made of such a porcelain can have desirable physical characteristics and high electrical resistivity. Such a porcelain can be used to manufacture a cathode ray tube funnel having thin, relatively lightweight walls that absorb X-radiation to the extent that the tube can be safely operated without metal shielding.

Other X-ray attenuating ingredients which can be included to form ceramic materials according to the present invention include compounds of molybdemum, neodymium, and tungsten. Although less preferred, these substances can be included in a ceramic material for X-ray attenuation, either alone or in combination with the substances listed above.

Either BaO or ZnO is useful if combined with another X-ray attenuating substance in a ceramic material. Substantial X-ray attentuation can also be achieved by certain ceramics containing at least twenty wt. percent ZnO or ten wt. percent of a mixture of BaO and ZnO.

Unlike glass funnels, ceramic funnels of the present invention may be easily drilled or cut before firing for the installation of electrical leads. And, the implosion strength of ceramic funnels of this invention is as much as twice that of glass funnels with comparable X-ray attenuating ability.

Accordingly, it is an object of this invention to eliminate the need for metal X-ray shielding of certain electronic devices by the use of an X-ray attenuating ceramic material.

Related objects are to provide an X-ray attenuating ceramic material which can be manufactured into bodies for electronic components and to provide such a ceramic material which can be manufactured from readily available ingredients.

A further object is to provide such an X-ray attenuating ceramic material which can be made into thin-walled bodies which are substantially vacuum tight.

Yet another object is to provide such a ceramic material which has a coefficient of thermal expansion similar to that of standard X-ray attenuating glass compositions so that components, such as cathode ray tubes, can be manufactured using a combination of ceramic and glass parts.

An additional object is to provide such a ceramic material which can be manufactured into bodies using simple tooling and at a low firing temperature, so that it is economical to make X-ray attenuating electrical components in small quantities.

It is also an object to provide such a ceramic material which has a high degree of electrical resistivity and which can easily be cut or drilled for the insertion of electrically conductive leads.

Still another object is to provide a ceramic batch formulation which can be pressed into a body that holds its shape and undergoes a minimum of shrinkage during firing.

A specific object is to manufacture funnels for cathode ray tubes from such a formulation.

These and other objects, features and advantages of the present invention will be apparent from the following description.

DETAILED DESCRIPTION

The present invention concerns a ceramic material which has the ability to attenuate X-radiation. The material has superior physical and forming characteristics so that it may be used in the manufacture of electrical components, such as funnels of cathode ray vacuum tubes, which require considerable physical strength and must be shaped and sized with accuracy.

Ceramic Materials

A preferred ceramic material according to this invention, includes a compound of strontium, yttrium, zirconium, niobium or a mixture of such compounds in an amount sufficient that the ceramic material has the property of absorbing X-rays.

Even small inclusions of these substances will measurably improve the X-ray attenuating ability of a ceramic material. But, markedly improved X-ray attenuating ability is observed when, on the oxide basis, at least one wt. percent of such substances is included. And, certain ceramic materials that contain at least twelve weight percent of these substances, have X-ray attenuating ability and physical properties at least as good as comparable X-ray attenuating glasses.

Individual X-ray attenuating substances should not be included above a particular amount. Specifically, the material should contain no more than about thirty wt. percent SrO, fourteen wt. percent $Y_2O_3$, fourteen wt. percent $ZrO_2$, and fourteen wt. percent $Nb_2O_3$. Additional amounts of these substances do not produce a helpful increase in X-ray attenuation, but can adversely affect the mechanical properties of the ceramic material.

Additional substances can be added to attenuate X-rays at certain desired wavelengths. These include compounds of molybdenum, neodymium and tungsten. Oxides of these substances ($MoO_3$, $Nd_2O_3$, and $WO_3$) are effective for X-ray attenuation when present alone or in combination with the others listed above. When used in combination with SrO, $Y_2O_3$, $ZrO_2$ or $Nb_2O_3$, it is preferred that a total of no more than fourteen wt. percent of these additional substances be included in the ceramic material. It is necessary for a ceramic material to include a total of at least one wt. percent of all the aforesaid substances to achieve meaningful X-ray attenuation. A material containing at least twelve wt. percent of such substances can be used to manufacture cathode ray tube funnels that can be used without external shielding. And, by including at least fourteen wt. percent of such substances it is possible to formulate an X-ray attenuating ceramic material that is fully equivalent in X-ray absorption and strength to known glass compositions.

ZnO and BaO are X-ray attenuating substances which can be combined with each other or with the above mentioned substances in order to formulate an X-ray attenuating ceramic material. ZnO, if present in large quantities, can be the sole X-ray attenuating substance in certain ceramic materials that are intended to absorb low energy X-rays. To absorb moderate to low energy X-radiation, BaO must be used in a combination with another X-ray attenuating substance, as discussed below.

The total amount of all X-ray attenuating substances present cannot exceed about 30 wt. percent of the ceramic material without causing serious degradation of physical properties.

Superior X-ray attenuatig ceramic materials are forsteritic porcelains which, in addition to including X-ray attenuating oxides, have the following compositions:
17–50 wt. percent MgO
2–20 wt. percent $Al_2O_3$ and
29–50 wt. percent $SiO_2$.

The ratio of MgO to $Al_2O_3$ can be adjusted to obtain a ceramic material with the best physical properties.

In particular, the thermal coefficient of expansion of a porcelain can be adjusted by altering this ratio. But, the combined amount of the two substances should not exceed fifty-three wt. percent of the material.

The most significant porcelain materials, according to this invention will include the following materials in the percentages stated, by weight on the oxide basis:
17–50 percent MgO;
2–20 percent $Al_2O_3$;
29–50 percent $SiO_2$;
0–20 percent ZnO;
0–2 percent CaO;
0–2 percent $Na_2O$;
0–2 percent $K_2O$;
0–4 percent SnO;
0–8 percent BaO;
0–30 percent SrO;
0–14 percent $ZrO_2$;
0–14 percent $Y_2O_3$;
0–14 percent $Nb_2O_3$;
0–14 percent $Rb_2O$;
0–14 percent $WO_3$; and
0–14 percent $MoO_3$.

Ceramic materials having the most preferred physical and electrical conductivity properties are obtained if the following substances are present in the more limited amounts stated, by weight on oxide basis:
35–44 percent MgO;
5–14 percent $Al_2O_3$;
35–43 percent $SiO_2$;
0–6 percent ZnO;
0–2 percent CaO;
0–1.0 percent $Na_2O$;
0–1.5 percent $K_2O$;
0–4 percent SnO;
0–5 percent BaO;
0–14 percent SrO;
0–14 percent $ZrO_2$;
0–14 percent $Y_2O_3$;
0–14 percent $Nb_2O_3$;
0–14 percent $Rb_2O$;
0–14 percent $WO_3$; and
0–14 percent $MoO_3$.

The firing temperatures of porcelain materials will vary depending on the ratio of the compounds included. To conserve energy and ease manufacturing it is desireable to use a ceramic material that fires at a low temperature. With few exceptions, ceramic materials defined by the immediately preceeding formula will fire at a desirably low temperature of 1300° C. or less.

Most X-ray attenuating substances raise the firing temperature when included in a ceramic-making batch. If the increase is excessive, it may be possible to reduce the firing temperature to an acceptable level by including a fluxing agent. It is particularly advantageous to include zinc oxide as a fluxing agent because ZnO not only reduces the firing temperature but also improves X-ray attenuation of a ceramic material.

To be effective as a fluxing agent, zinc oxide must be present in an amount sufficient to lower the firing temperature of the entire mixture. In most instances, a reasonably low firing temperature is achieved if the ceramic material includes at least one wt. percent ZnO in addition to the other X-ray attenuating substances present. For ceramic materials according to the present invention, a reasonably low firing temperature is consistently obtained when between 3 and 5 percent $ZnO_2$ is present.

Ceramic materials containing BaO are examples of materials that can benefit from the use of ZnO as a fluxing agent. A ceramic material will attenuate high energy X-radiation, such as the radiation which would be generated within a cathode ray tube operating at above 37 kV, if even a relatively small amount of barium oxide (BaO) is present. But, to effectively attenuate X-radiation emmiting from a tube operating at a lower voltage, twenty wt. percent or more BaO would be required if the BaO were the only X-ray attenuating substance present in a ceramic material. This presents a problem, because adding large amounts of barium increases the fusion temperature of a ceramic material to an unacceptable level. A fluxing agent may be included to offset the effect of the barium and return the firing temperature of the ceramic material to within a usable range. But, if a nonattenuating fluxing agent is added in an effective amount, the result is an undesirable reduction in the percentage of some important constituent of the ceramic material.

This dilemma is eliminated by using zinc oxide as a fluxing agent. In addition to lowering the firing temperature, ZnO contributes to the overall X-ray attenuating ability of the ceramic material. As a result, the amount of BaO can be reduced and the balance of the ceramic batch maintained within acceptable limits. A ceramic material having between five and twenty-eight wt. percent barium oxide combined with between three and fourteen wt. percent zinc oxide is effective for attenuating X-rays generated in a tube operating at a voltage less than 37 kV.

Even lesser amounts of ZnO are required to offset the firing temperature increase produced by inclusion of most X-ray attenuating substances other than BaO.

For example, a small amount of a fluxing agent such as ZnO is useful in the formulation of ceramic materials containing $ZrO_2$ for X-ray attenuation. If an effective amount of $ZrO_2$ is the sole X-ray attenuating substance in a ceramic material, it is likely that fired bodies will be overly porous for vacuum tube use. To reduce porosity, the ceramic material should include ZnO, SrO or a combination thereof in addition to $ZrO_2$. For the ceramic to have a reasonable firing temperature, the $ZrO_2$ should not be more than 55 wt. percent of the combined amounts of ZnO, SrO, $ZrO_2$ and BaO present.

Limited amounts of alkali metal oxides can be present in X-ray attenuating ceramic compositions. Certain of these have beneficial fluxing properties; but the use of such substances should be minimized and carefully regulated. Specifically, the combined amount of $Na_2O$, $K_2O$ and $Li_2O$ should be less than three wt. percent of the material. The best results are achieved when less than 1.0 percent of $Na_2O$ and less than 0.5 percent of $Li_2O$ are present. And, the amount of $Na_2O$ should not exceed the amount of $K_2O$. Outside these ranges, there is a marked deterioration in the physical and electrical properties of the ceramic; and the manufacturing process tends to be more difficult.

Lead oxide (PbO) is a fluxing agent which is known to have substantial X-ray attenuating ability. But, if PbO is added to a ceramic-making batch, the firing temperature is so greatly reduced that the ceramic slumps during firing. The escape of gaseous PbO during firing causes excessive shrinking of the ware and is environmentally hazardous. Thus, it is best to omit lead compounds from batches for making ceramic materials according to the present invention. In no event should lead be present in such an amount that lead oxide exceeds five wt. percent of the fired ceramic.

Electronic Components

A variety of electronic components can be manufactured using one of the above-described ceramic materials. Most preferred are the forsteritic porcelains described above. When designing such a ceramic material for a particular use, it is important that consideration be given to the energy of the X-rays to be absorbed. This is because different ceramic compositions will be more or less absorbtive depending on the wavelength of the incident radiation. Once the X-radiation wavelength is determined, it is possible to obtain the maximum absorption by appropriately formulating the ceramic material used to make the component.

For example, it is advantageous to use X-ray attenuating substances in the manufacture of certain cathode ray tubes. Such tubes might include a glass faceplate sealed to the mouth of a ceramic funnel with a fluorescent screen on the inner surface of the faceplate and an electron gun within the sealed tube. If such a tube were intended to operate at relatively high voltages above about 37 kV, it would be advantageous for the ceramic material of the funnel to contain a high percentage of BaO, barium being effective to attenuate high energy X-rays. In cathode ray tubes which operate at a lower voltage, barium oxide would be much less effective for X-ray attenuation, and should be omitted in favor of other substances discussed above.

Cathode ray tubes operating in the 24–28 kV range are commonly used in devices such as oscilloscopes. To manufacture a safe, unshielded tube of that type, one could use a ceramic material according to the present invention, that contained at least fourteen wt. percent of substances selected from the group including ZrO, $ZnO_2$, $Y_2O_3$, $Nb_2O_3$, $Rb_2O$, $WO_3$, $MoO_3$ and mixtures thereof. To sufficiently absorb low energy X-radiation of the type produced in a cathode ray tube operating at 18–20 kV, the ceramic would need to include a minimum of only about twelve wt. percent of substances from the group. Low-energy X-radiation is likewise absorbed adequately by an unshielded funnel made of a ceramic material containing at least twenty wt. percent ZnO as the sole X-ray attenuating substance.

Regardless of its X-ray attenuating ability, it is important that the ceramic material used in a cathode ray tube funnel be compatible with the faceplate glass and other components of the tube. Of particular importance, the thermal coefficient of expansion must be similar for the glass faceplate and the ceramic funnel. Due to the great capital investment required, faceplate glass is mass produced and only certain specific types are available. To manufacture small quantities of a special purpose cathode ray tubes, it is thus necessary to use a funnel made of a ceramic material having the same thermal coefficient of expansion as an available faceplate glass. A desired coefficient can usually be obtained by formulating the ceramic material to include MgO and $Al_2O_3$ at a proper ratio.

Compatibility with available faceplate glasses is achieved most readily using a forsteritic ceramic material that includes between 30 and 50 wt. percent MgO and 2 to 20 percent $Al_2O_3$. The relative amount of magnesium and aluminum can be adjusted within such ranges to manufacture X-ray attenuating ceramic materials suitable for use with standard faceplate glass materials having a coefficient of thermal expansion of $88-100 \times 10^{-7}$ in./in. per °C. (50°–500° C.).

Batch Formulations

Certain unique batch formulas according to the invention make it possible to manufacture X-ray attenuating ceramic products with ease. In particular, $SrZrO_3$ can be included with the raw materials of a ceramic-making batch to provide two highly effective X-ray attenuating substances without greatly affecting the firing temperature of the ceramic. Since $SrZrO_3$ is not hydrated, and does not otherwise contain substances which volatilize upon firing, $SrZrO_2$ additions do not create shrinkage or slumping problems. Advantageously, a batch for the manufacture of a ceramic material will contain between one and twenty wt. percent $SrZrO_3$. An additional amount of other X-ray attenuating ingredients may also be present.

Other materials which may be advantageous as ingredients of certain batches include $ZrSiO_4$ and $SrCO_3$.

A preferred batch for forsteritic porcelain materials would be:
  43–56 percent talc;
  17–24 percent MgO;
  8–16 percent feldspar;
  3–5 percent ZnO;

2–13 percent $Al_2O_3$; and

1–30 percent of a substance to enhance X-ray attenuation selected from the group consisting of $ZrSiO_4$, $SrCO_3$, $SrZrO_3$ and mixtures thereof. Most preferably, such a batch would contain 10–20 wt. percent $SrZrO_3$. Such forsteritic materials are excellent for the manufacture of a cathode ray tube funnel to be sealed with a glass faceplate, particularly if the electron gun will be operated at a voltage below about 37 kV.

Procedure

An advantage of the ceramic materials of the present invention is that they can be used to form ceramic bodies by substantially conventional techniques. The batch ingredients are combined with water in a ballmill and milled for a period of about 7.5 hours. The resulting slurry is spray-dried to provide a powder of spherical particles. To form a funnel-shaped body for a cathode ray tube, the powder is placed between a mandrel and an outer polyurethane boot and compressed at of about 12,000 psi in an isostatic press.

The formed funnels are then fired in a kiln to a dense ceramic. Some shrinkage of the bodies occurs during firing. But the extent of shrinkage is controlled by using an appropriate pressure during formation of the body and by selecting the batch ingredients so that the loss on ignition is within a desired low range.

EXAMPLES

Batches suitable for forming forsteritic porcelain cathode ray tube funnels are specified in Table I. The table shows numerous batches successfully used to manufacture porcelain bodies according to the present invention. Also included, for comparison purposes, are several batches for old forsterite materials.

TABLE I

BATCH FORMULATION (wt. %)

| | EXAMPLE NO.: | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| MgO | 23.6 | 16.5 | 19.0 | 20.5 | 23.0 | 18.0 | 20.0 | 23.5 | 18.8 | 18.8 | 20.8 | 22.8 | 18.4 |
| $Al_2O_3$ | 8.1 | 9.0 | 8.0 | 8.65 | 6.15 | 11.2 | 9.2 | 5.6 | 7.8 | 7.8 | 5.8 | 3.8 | 7.6 |
| Talc | 34.6 | 51.0 | 50.0 | 50.0 | 54.0 | 54.0 | 54.0 | 54.0 | 49.4 | 49.4 | 49.4 | 49.4 | 48.3 |
| Feldspar | — | — | 13.0 | 10.0 | 10.0 | 10.0 | 10.0 | 10.0 | 9.1 | 9.1 | 9.1 | 9.1 | 8.8 |
| ZnO | 5.0 | 5.0 | 5.0 | 5.0 | 5.0 | 5.0 | 5.0 | 5.0 | — | 5.0 | 5.0 | 5.0 | 4.8 |
| Whiting | — | — | 5.0 | 1.85 | 1.8 | 1.8 | 1.8 | 1.8 | 1.8 | — | — | — | — |
| Fused Forsterite | — | — | — | — | — | — | — | — | — | — | — | — | — |
| $Mg(OH)_2$ | — | 3.5 | — | — | — | — | — | — | — | — | — | — | — |
| Nepheline Syenite | 23.4 | 15.0 | — | — | — | — | — | — | — | — | — | — | — |
| Dolomite | 10.3 | — | — | — | — | — | — | — | — | — | — | — | — |
| $MgCO_3$ | — | — | — | — | — | — | — | — | — | — | — | — | — |
| EPK | — | — | — | — | — | — | — | — | — | — | — | — | — |
| Barium Carbonate | — | — | — | — | — | — | — | — | — | 14.9 | — | — | — |
| Strontium Carbonate | — | — | — | — | — | — | — | — | — | — | 9.9 | 9.9 | 9.9 | 12.1 |
| Strontium Frit | — | — | — | — | — | — | — | — | — | — | — | — | — |
| $ZrO_2$ | — | — | — | — | — | — | — | — | — | — | — | — | — |
| Strontium Zirconate | — | — | — | — | — | — | — | — | — | — | — | — | — |
| Barium Zirconate | — | — | — | — | — | — | — | — | — | — | — | — | — |
| Zirconium Silicate | — | — | — | — | — | — | — | — | — | — | — | — | — |
| RE Oxide (Molycorp) [$Y_2O_3$(62.6)]Type 5650 | — | — | — | — | — | — | — | — | — | — | — | — | — |

| | EXAMPLE NO.: | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| MgO | 17.9 | 0.9 | — | 0.9 | — | — | — | — | — | — | 17.9 | 20.0 | 20.0 |
| $Al_2O_3$ | 7.4 | 7.0 | 2.9 | 2.9 | 2.8 | 10.4 | 12.3 | 1.0 | 1.0 | 1.0 | 7.5 | 1.0 | 1.0 |
| Talc | 47.1 | 46.0 | — | — | — | 54.6 | 55.2 | 46.2 | 47.3 | 45.1 | 47.1 | 46.9 | 46.9 |
| Feldspar | 8.7 | 9.0 | — | — | — | — | — | — | — | — | 8.7 | 8.7 | 8.7 |
| ZnO | 4.8 | 5.0 | — | — | — | — | — | — | — | — | 4.7 | 4.7 | 4.7 |
| Whiting | — | — | — | — | — | — | — | — | — | — | — | — | — |
| Fused Forsterite | — | — | 82.8 | 82.0 | 81.2 | — | — | — | — | — | — | — | — |
| $Mg(OH)_2$ | — | — | — | — | — | — | — | — | — | — | — | — | — |
| Nepheline Syenite | — | — | — | — | — | — | — | — | — | — | — | — | — |
| Dolomite | — | — | — | — | — | — | — | — | — | — | — | — | — |
| $MgCO_3$ | — | — | — | 1.9 | — | — | — | — | — | — | — | — | — |
| EPK | — | — | — | — | — | — | — | 27.3 | 28.5 | 26.2 | — | — | — |
| Barium Carbonate | — | — | — | — | — | — | — | — | — | — | — | — | — |
| Strontium Carbonate | 14.1 | 16.0 | 13.4 | 13.2 | 13.1 | — | — | 25.5 | 23.2 | 27.7 | — | — | — |
| Strontium Frit | — | — | — | — | — | 35.0 | 32.5 | — | — | — | — | — | — |
| $ZrO_2$ | — | — | — | — | — | — | — | — | — | — | — | — | 18.7 |
| Strontium Zirconate | — | — | — | — | — | — | — | — | — | — | — | — | — |
| Barium Zirconate | — | — | — | — | — | — | — | — | — | — | — | — | — |
| Zirconium Silicate | — | — | — | — | — | — | — | — | — | — | — | 14.1 | 18.7 | — |
| RE Oxide (Molycorp) [$Y_2O_3$(62.6)]Type 5650 | — | — | — | — | 2.0 | — | — | — | — | — | — | — | — |

| | EXAMPLE NO.: | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| MgO | 20.0 | 23.8 | 23.8 | 23.8 | 18.0 | 18.0 | 19.0 | 21.3 | 18.0 | 28.0 | — | — | — |
| $Al_2O_3$ | 1.0 | 1.4 | 1.4 | 1.4 | 5.6 | 5.6 | 2.2 | 2.4 | 5.6 | — | 85.0 | — | — |
| Talc | 46.9 | 46.9 | 46.9 | 46.9 | 43.9 | 43.9 | 43.3 | 41.2 | 43.9 | 60.0 | 4.0 | 68.5 | 71.1 |
| Feldspar | 8.7 | 8.7 | 8.7 | 8.7 | 14.0 | 14.0 | 16.0 | 14.3 | 14.0 | — | — | — | — |
| Zno | 4.7 | 4.7 | 4.7 | 4.7 | 4.6 | 18.5 | 3.5 | 3.5 | 4.6 | — | — | — | — |
| Whiting | — | — | — | — | — | — | — | — | — | — | — | — | — |

TABLE I-continued

| BATCH FORMULATION (wt. %) | | | | | | | | | | | | | |
|---|---|---|---|---|---|---|---|---|---|---|---|---|---|
| Fused Forsterite | — | — | — | — | — | — | — | — | — | — | — | — | — |
| Mg(OH)$_2$ | — | — | — | — | — | — | — | — | — | — | — | 20.4 | 19.5 |
| Nepheline Synenite | — | — | — | — | — | — | — | — | — | — | 4.0 | — | — |
| Dolomite | — | — | — | — | — | — | — | — | — | — | — | — | — |
| MgCO$_3$ | — | — | — | — | — | — | — | — | — | — | — | — | — |
| EPK | — | — | — | — | — | — | — | — | — | 12.0 | — | 11.1 | 2.6 |
| Ball Clay | — | — | — | — | — | — | — | — | — | — | 7.0 | — | 6.8 |
| Barium Carbonate | — | — | — | — | — | — | — | — | — | — | — | — | — |
| Strontium Carbonate | — | — | — | — | — | — | — | — | — | — | — | — | — |
| Strontium Frit | 9.35 | — | — | — | — | — | — | — | — | — | — | — | — |
| ZrO$_2$ | 9.35 | — | 14.0 | — | — | — | 10.0 | — | 14.0 | — | — | — | — |
| Strontium Zirconate | — | — | — | 14.0 | 14.0 | — | 4.0 | 14.3 | — | — | — | — | — |
| Barium Zirconate | — | 14.0 | — | — | — | — | — | — | — | — | — | — | — |
| Zirconium Silicate | — | — | — | — | — | — | — | — | — | — | — | — | — |
| RE Oxide (Molycorp [Y$_2$O$_3$(62.6)]Type 5650) | — | — | — | — | — | — | — | — | — | — | — | — | — |

Forsteritic porcelain funnels for cathode ray tubes were made from the batches of Examples 1–35. In each example, a funnel was formed as described above. Firing took from one to two hours at a temperature within the range of 1200° to 1270° C. The specific firing temperature and time for each example was selected empirically to provide a funnel having the best physical properties. Ceramic porosity could be decreased by raising the firing temperature; but slumping problems would result if the temperature was too high. Thus, in each example, the kiln temperature was set as high as possible below the temperature at which there was undue slumping of the ware.

Most of the batches of Examples 1–35 include raw materials that are naturally occuring substances, such as talc and feldspar. A variety of different talcs and feldspars could be used in the batches that require such materials. For instance, a highly preferred forsteritic porcelain is manufactured from the batch of Example 34 using the following specific materials:

| | wt % |
|---|---|
| 45-26 talc | 9.6 |
| Yellowstone talc | 9.6 |
| 98-25 talc | 9.6 |
| 99-54 talc | 14.5 |
| Custer spar | 14.0 |
| MgO | 20.8 |
| Al$_2$O$_3$ | 2.4 |
| ZnO | 3.5 |
| SrZrO$_3$ | 14.0 |
| Cr$_2$O$_3$ | 1.0 |
| Sodium hexametaphosphate | 1.0 |

If the overall ratio of talc and feldspar was maintained, but other combinations of specific talcs and feldspars used, there would be small variations in the resulting ceramic materials. Accordingly, it would be necessary to more particularly specify the talcs and feldspars if one wished to precisely duplicate the ceramic-making batches listed in Table I. For brevity, a breakdown of specific talcs and feldspars is not listed for each batch appearing in Table I. A person of ordinary skill in this art would be able to select a suitable mixture of talcs and feldspars for each of the listed batches.

Examples 1–8 descripe forsteritic ceramic materials which are not sufficiently of X-radiation that they can be used in the manufacture of unshielded cathode ray tubes. The porcelains of Examples 6–7 are illustrative of materials that have been used for a number of years to form cathode ray tube funnels that require external shielding.

Examples 36–39 are found in prior art literature. The batches of Examples 36 and 37 are described in U.S. Pat. No. 3,207,936 (Wilbanks et al.) at columns 5 and 6, respectively. The batches of Examples 38 and 39 are described in U.S. Pat. No. 2,912,340 (Pinkus) at Table III (Pinkus batches 1 and 11). Example 9 describes a ceramic material similar to that of Example 39.

Examples 10–35 describe forsteritic ceramic materials. Cathode ray tubes having unshielded funnels made of such materials can be operated safely at 20 kV. The better-attenuating materials of examples 19–23, 26, 27, 30, 31 and 33–35 are suitable for tubes operating at 28 kV.

The calculated oxide compositions of ceramic materials made from the batches of Table I appear in Table II. The actual compositions are believed to conform closely to the figures which appear.

TABLE II

| COMPUTED COMPOSITION (wt. %) (OXIDE BASIS) | | | | | | | | | | | | | |
|---|---|---|---|---|---|---|---|---|---|---|---|---|---|
| | EXAMPLE NO.: | | | | | | | | | | | | |
| | 1 | 2 | 3 | 4 | 5 | 6 | 7 | 8 | 9 | 10 | 11 | 12 | 13 |
| MgO | 37.7 | 35.5 | 35.78 | 38.10 | 40.62 | 36.6 | 38.8 | 42.4 | 39.0 | 36.5 | 38.7 | 40.8 | 36.0 |
| Al$_2$O$_3$ | 14.6 | 13.6 | 11.27 | 11.30 | 8.75 | 13.6 | 11.4 | 7.8 | 10.9 | 10.2 | 8.1 | 5.9 | 10.0 |
| SiO$_2$ | 35.2 | 41.5 | 41.95 | 41.87 | 41.87 | 42.4 | 41.8 | 42.4 | 42.2 | 39.4 | 39.4 | 39.4 | 38.7 |
| K$_2$O | 1.1 | 0.7 | 1.41 | 1.07 | 1.07 | 0.8 | 0.8 | 0.8 | 0.8 | 0.7 | 0.7 | 0.7 | 0.7 |
| Na$_2$O | 2.6 | 1.6 | 0.49 | 0.40 | 0.38 | 0.3 | 0.4 | 0.4 | 0.4 | 0.3 | 0.3 | 0.3 | 0.3 |
| CaO | 7.3 | 0.2 | 3.3 | 1.49 | 1.52 | 1.1 | 1.1 | 1.1 | — | — | — | — | — |
| BaO | — | — | — | — | — | — | — | — | 6.8 | — | — | — | — |
| SrO | — | — | — | — | — | — | — | — | — | 7.5 | 7.5 | 7.5 | 9.1 |
| ZrO$_2$ | — | — | — | — | — | — | — | — | — | — | — | — | — |
| ZnO | — | 5.1 | 5.16 | 5.09 | 5.09 | 5.2 | 5.3 | 5.2 | — | 5.3 | 5.3 | 5.3 | 5.2 |

TABLE II-continued

COMPUTED COMPOSITION (wt. %) (OXIDE BASIS)

|  | | | | | | | | | | | | | |
|---|---|---|---|---|---|---|---|---|---|---|---|---|---|
| $Fe_2O_3$ | 0.5 | 1.8 | 0.63 | 0.67 | 0.67 | — | 0.40 | — | — | — | — | — | — |
| $Cr_2O_3$ | — | — | — | — | — | — | — | — | — | — | — | — | — |
| $P_2O_5$ | — | — | — | — | — | — | — | — | — | — | — | — | — |
| Zircon | — | — | — | — | — | — | — | — | — | — | — | — | — |
| $BaZrO_3$ | — | — | — | — | — | — | — | — | — | — | — | — | — |
| $SrZrO_3$ | — | — | — | — | — | — | — | — | — | — | — | — | — |
| $Y_2O_3$ + R.E. Oxides | — | — | — | — | — | — | — | — | — | — | — | — | — |

| EXAMPLE NO.: | 14 | 15 | 16 | 17 | 18 | 19 | 20 | 21 | 22 | 23 | 24 | 25 | 26 |
|---|---|---|---|---|---|---|---|---|---|---|---|---|---|
| MgO | 36.0 | 33.37 | 48.63 | 48.63 | 47.66 | 17.4 | 17.7 | 17.98 | 18.30 | 18.48 | 32.55 | 34.92 | 24.92 |
| $Al_2O_3$ | 9.1 | 9.74 | 3.81 | 3.81 | 3.74 | 15.9 | 15.8 | 12.61 | 12.75 | 11.82 | 9.60 | 3.19 | 3.19 |
| $SiO_2$ | 37.4 | 37.58 | 35.34 | 35.34 | 34.14 | 50.0 | 49.2 | 49.08 | 49.16 | 48.50 | 35.75 | 36.01 | 36.01 |
| $K_2O$ | 0.6 | 1.00 | — | — | — | — | — | — | — | — | 0.91 | 0.92 | 0.92 |
| $Na_2O$ | 0.3 | 0.81 | 0.44 | .43 | — | — | 0.77 | 0.78 | 0.75 | 0.88 | 0.33 | 0.33 | — |
| CaO | 0.1 | 0.40 | — | — | — | — | 0.1 | 0.39 | 0.41 | 0.35 | 0.52 | 0.60 | 0.60 |
| BaO | — | — | — | — | — | — | — | — | — | — | — | — | — |
| SrO | 10.5 | 10.82 | 11.18 | 11.18 | 10.97 | 16.7 | 16.6 | 19.40 | 18.60 | 20.10 | — | — | — |
| $ZrO_2$ | — | — | — | — | — | — | — | — | — | — | — | — | — |
| ZnO | 5.4 | 5.31 | — | — | — | — | — | — | — | — | 4.70 | 4.73 | 4.73 |
| $Fe_2O_3$ | 0.6 | 0.36 | — | — | — | 0.6 | — | — | — | — | 0.57 | 0.58 | 0.58 |
| $Cr_2O_3$ | — | — | — | — | — | — | — | — | — | — | — | — | — |
| $P_2O_5$ | — | 0.59 | 0.57 | 0.57 | .56 | — | — | — | — | — | 0.61 | — | — |
| Zircon | — | — | — | — | — | — | — | — | — | — | 13.89 | 18.72 | — |
| $BaZrO_3$ | — | — | — | — | — | — | — | — | — | — | — | — | — |
| $SrZrO_3$ | — | — | — | — | — | — | — | — | — | — | — | — | — |
| $Y_2O_3$ + R.E. Oxides | — | — | — | — | 2.00 | — | — | — | — | — | — | — | — |

| EXAMPLE NO.: | 27 | 28 | 29 | 30 | 31 | 32 | 33 | 34 | 35 | 36 | 37 | 38 | 39 |
|---|---|---|---|---|---|---|---|---|---|---|---|---|---|
| MgO | 34.92 | 32.55 | 32.55 | 32.55 | 34.5 | 34.5 | 34.0 | 35.5 | 34.5 | 48.19 | 1.26 | 39.44 | 39.00 |
| $Al_2O_3$ | 3.19 | 9.60 | 9.60 | 9.60 | 3.3 | 3.3 | 5.9 | 5.7 | 3.3 | 5.28 | 89.42 | 4.89 | 3.3 |
| $SiO_2$ | 40.92 | 35.75 | 35.75 | 35.75 | 39.8 | 39.8 | 39.3 | 37.5 | 39.8 | 45.05 | 8.57 | 53.80 | 50.5 |
| $K_2O$ | 0.92 | 0.91 | 0.91 | 0.91 | 1.1 | 1.1 | 1.2 | 1.0 | 1.1 | .25 | .22 | .22 | — |
| $Na_2O$ | 0.33 | 0.88 | 0.88 | 0.88 | 0.5 | 0.5 | 0.6 | 0.5 | 0.5 | .02 | .45 | .22 | — |
| CaO | 0.60 | 0.52 | 0.52 | 0.52 | 0.2 | 0.2 | 0.2 | 0.2 | 0.2 | .12 | .01 | .20 | — |
| BaO | — | — | — | — | 0.2 | — | 0.10 | 0.2 | — | — | — | — | 6.0 |
| SrO | 4.48 | — | — | — | 6.6 | — | 1.8 | 6.3 | — | — | — | — | — |
| $ZrO_2$ | 9.35 | — | 13.91 | — | 8.4 | — | 12.8 | 8.0 | 15.2 | — | — | — | — |
| ZnO | 4.73 | 4.70 | 4.70 | 4.70 | 5.0 | 20.2 | 3.7 | 3.6 | 5.0 | — | — | — | — |
| $Fe_2O_3$ | 0.58 | 0.57 | 0.57 | 0.57 | 0.4 | 0.4 | 0.4 | 0.4 | 0.4 | 1.09 | .07 | 1.23 | — |
| $Cr_2O_3$ | — | — | — | — | — | — | 0.1 | — | — | — | — | — | — |
| $P_2O_5$ | — | 0.61 | 0.61 | 0.61 | — | — | — | — | — | — | — | — | — |
| Zircon | — | — | — | — | — | — | — | — | — | — | — | — | — |
| $BaZrO_3$ | — | 13.9 | — | — | — | — | — | — | — | — | — | — | — |
| $SrZrO_3$ | — | — | — | 13.91 | — | — | — | — | — | — | — | — | — |
| $Y_2O_3$ + R.E. Oxides | — | — | — | — | — | — | — | — | — | — | — | — | — |

Physical and electrical properties of the ceramic materials listed in Table II are summarized in Table III.

TABLE III

PROPERTIES OF FIRED BODIES (wt. %)

| EXAMPLE NO.: | 1 | 2 | 3 | 4 | 5 | 6 | 7 | 8 | 9 | 10 | 11 | 12 | 13 |
|---|---|---|---|---|---|---|---|---|---|---|---|---|---|
| L.O.I. (%) | — | — | — | — | — | 7.2 | 7.1 | 7.2 | — | — | — | — | — |
| Linear Shrinkage (%) | — | — | — | — | — | 11.7 | 11.7 | 11.7 | — | — | — | — | — |
| Fired Density (g/cc) | 2.75 | 2.83 | 2.83 | 2.84 | 2.82 | 2.85 | 2.83 | 2.84 | — | 3.00 | 3.02 | 3.01 | 3.00 |
| C.T.E. $\times 10^{-7}$ in/in °C. (Range = 50°–500° C.) | — | — | 102. | 88. | 96. | 91.6 | 94.4 | 98.4 | — | 91.6 | 95.6 | 98.2 | 93.9 |
| $\log_{10} \rho$ @ RT ($\Omega \cdot cm$) | 14.95 | 11.84 | 17.09 | 15.42 | 16.17 | — | 15.65 | 15.80 | — | 16.48 | — | — | 17.48 |
| $\omega$ @ 0.6Å | 1.77 | 3.00 | 3.07 | 2.87 | 2.88 | 2.70 | 2.81 | 2.70 | 3.05 | 6.38 | 6.38 | 6.38 | 7.15 |
| $\mu$ @ 0.6Å | 4.87 | 8.49 | 8.69 | 8.15 | 8.12 | 7.70 | 7.95 | 7.67 | — | 19.14 | 19.27 | 19.20 | 21.45 |
| Dye Tight | yes | yes | yes | yes | yes | yes | yes | yes | no | yes | yes | yes | yes |

| EXAMPLE NO.: | 14 | 15 | 16 | 17 | 18 | 19 | 20 | 21 | 22 | 23 | 24 | 25 | 26 |
|---|---|---|---|---|---|---|---|---|---|---|---|---|---|
| L.O.I. (%) | 10.9 | 11.8 | 8.6 | 9.5 | — | 6.3 | 6.5 | 14.9 | 14.5 | 15.4 | 6.4 | 6.2 | 6.4 |
| Linear Shrinkage (%) | 13.2 | 14.6 | 17.3 | 18.3 | — | 12.3 | 12.0 | — | — | — | 12.3 | 13.2 | 12.1 |
| Fired Density (g/cc) | 2.96 | 3.05 | 2.99 | 3.00 | 3.00 | 2.79 | 2.78 | 2.85 | 2.81 | 2.78 | 2.92 | 2.83 | 2.85 |
| C.T.E $\times 10^{-7}$ in/in | 94.0 | 94.1 | 94.6 | — | 95.7 | 64.2 | 63.8 | — | — | — | 86.9 | 91.8 | — |

TABLE III-continued

PROPERTIES OF FIRED BODIES
(wt. %)

| | | | | | | | | | | | | | |
|---|---|---|---|---|---|---|---|---|---|---|---|---|---|
| °C. (Range = 50°–500° C.) | | | | | | | | | | | | | |
| $\log_{10} \rho$ @ RT ($\Omega \cdot cm$) | 17.84 | — | — | — | — | — | — | — | — | — | — | — | — |
| ω @ 0.6Å | 8.04 | 8.20 | 6.62 | 6.62 | 7.5 | 9.75 | 9.83 | 11.14 | 10.73 | 11.48 | 7.35 | 9.04 | 9.92 |
| μ @ 0.6Å | 23.80 | 25.01 | 19.80 | 19.87 | 22.54 | 27.20 | 27.35 | 31.75 | 30.17 | 31.92 | 21.47 | 25.58 | 28.27 |
| Dye Tight | yes | yes | yes | yes | yes | yes | yes | yes | yes | yes | yes | yes | yes |

| | EXAMPLE NO.: | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| L.O.I. (%) | 6.9 | 6.5 | 6.8 | 6.5 | — | — | — | — | — | — | — | — | — |
| Linear Shrinkage (%) | 10.5 | 15.1 | 8.6 | 15.2 | — | — | — | — | — | — | — | — | — |
| Fired Density (g/cc) | 2.91 | 3.23 | 2.67 | 3.21 | 3.13 | 3.12 | 3.04 | 3.10 | 2.93 | (2.6) | (3.5) | 2.615 | 2.8 |
| C.T.E. $\times 10^{-7}$ in/i | — | 104.5 | — | 103.5 | — | — | — | 96.0 | — | — | — | — | — |
| °C. (Range = 50°–500° C.) | | | | | | | | | | | | | |
| $\log_{10} \rho$ @ RT ($\Omega \cdot cm$) | — | — | — | — | — | — | — | — | — | — | — | — | — |
| ω @ 0.6Å | 9.65 | 7.87 | 9.60 | 9.53 | 10.30 | 6.99 | 9.67 | 9.74 | 10.38 | 1.42 | 0.34 | 1.64 | 2.93 |
| μ @ 0.6Å | 28.08 | 25.44 | 25.64 | 30.60 | 32.26 | 21.81 | 29.39 | 30.19 | 30.41 | 3.70 | 1.2 | 4.3 | 8.2 |
| Dye Tight | yes | yes | no | yes | yes | yes | yes | yes | yes | yes | yes | yes | yes |

Each of the ceramic materials listed for Examples 1–35 is a porcelain of sufficient mechanical strength that it can be used for the manufacture of electronic components such as cathode ray tube funnels. All but three of those ceramic materials (the materials of Examples 9, 26 and 29) were sufficiently nonporous that they could be used for cathode ray tube funnels. It is believed that nonporous bodies could be formed from batches of Examples 9, 26 and 29 merely by elevating the kiln temperature to slightly above 1270° C.

Although the listed porcelains have many common physical properties, Table III shows that the X-ray attenuating ability varies considerably depending on the composition.

Ceramics not having X-ray attenuating substances according to the present invention, e.g; those manufactured from the batches of Examples 1 and 36–38, have very low absorption coefficients for X-rays at 0.6 angstroms.

The prior art forsteritic porcelain of Example 39, having six wt. percent barium oxide (and similarly the porcelain of Example 9), has somewhat greater X-ray attenuating ability than plain forsteritic porcelain. But, a cathode ray tube funnel made of such a ceramic material would not absorb sufficient X-radiation at 0.6 angstroms to eliminate the need for lead shielding. And, it would be difficult or impossible to obtain increased absorption of such radiation by simply increasing the amount of barium oxide in the ceramic. Any substantial increase in BaO would degrade the physical properties of the porcelain.

Batches containing small amounts of ZnO as the sole attenuating ingredient, e.g., the batches of Examples 2–8, likewise produced porcelains having insufficient X-ray attenuating ability to be useful for unshielded cathode ray tube funnels. Example 32 demonstrates that it is possible to manufacture a ceramic material containing a relatively large amount (20.2 wt. percent) of ZnO. This material has increased X-ray attenuating ability, a mass absorption coefficient of 6.99 cm$^2$/g and linear absorption coefficient of 21.81 cm$^{-1}$ for X-rays at 0.6 angstroms. At these levels, the Example 32 material can be used for unshielded funnels, but only if the tube is operated at voltage below about 20 kV. Although this material is a much better attenuator of X-radiation than ceramic materials known heretofore, it does not have high enough absorption coefficients to be a practical choice for cathode ray tubes to be operated at higher voltages.

In the absence of other attenuating substances, a ceramic material would require at least twenty wt. percent ZnO to make safe, unshielded funnels for cathode ray tubes that operate at the relatively low voltage of 20 kV. And, it would be difficult to manufacture a body with good mechanical properties if the amount of zinc was further increased.

In the examples where the greatest X-ray attenuating ability is obtained, a ceramic includes a compound containing metals having the atomic numbers between 38 and 41. Most commonly, these substances are present as oxides, SrO, Y$_2$O$_3$, ZrO$_2$, Nb$_2$O$_3$. Other metals in or below the fifth row of the periodic chart can be incorporated in a ceramic composition for the purpose of X-ray attenuation, but the aforesaid group is most effective and is readily available.

SrO is present in the ceramic materials of Examples 16–23 and is present along with ZnO in the materials of Examples 10–15. These porcelains have X-ray absorption coefficients several times greater in magnitude than those of standard forsteritic porcelains such as that of Example 1.

Ceramic materials containing ZrO also have good X-ray attenuating ability and physical properties. Examples are ceramics containing a combination of zirconium and zinc oxides, made from the batches of Examples 29 and 35. Similar properties were found for ceramic materials containing zirconium silicate and zinc oxide as described in Examples 24 and 25.

More complex mixtures of X-ray attenuating substances also work well in ceramic materials. Examples 27, 31, 33 and 34 show that strontium oxide, zirconium oxide, and zinc oxide can be effectively combined, with or without small amounts of barium oxide, in a ceramic material having good physical properties and the ability to attenuate X-rays.

Ceramics with zirconates of barium and strontium, such as those of Examples 28 and 30, are also effective. In the particular porcelains described, zirconates are used in combination with zinc oxide which contributes to the overall amount of X-ray attenuation.

Any of the ceramic materials listed in Table II can be formed into a ceramic funnel structure of sufficient strength for use in the manufacture of a cathode ray tube. But, funnels manufactured using ceramic materials of the present invention would meet industry and government standards for the attenuation of X-rays at 0.6 angstroms. Certain ceramic compositions of the present invention can be used to form funnels which have walls of normal thickness and yet closely rival the X-ray attenuating ability of the best glass funnels. Furthermore, such ceramic funnels have greater implosion strength at a given wall thickness or tube weight.

Current Government safety standards require that X-ray transmission through a cathode ray tube body be limited to 0.5 milliroentgen per hour (mr/h). Heretofore, a cathode ray tube with a ceramic funnel could meet these standards only if it was shielded with metal or operated at a voltage so low that its display was too dim to use. The ceramic material of the present invention allows the manufacture of a cathode ray tube with a ceramic funnel of normal weight and size. An electron beam of sufficiently high energy to produce a bright display is safely contained in such a ceramic funnel without the use of metal shielding.

Figure 1:
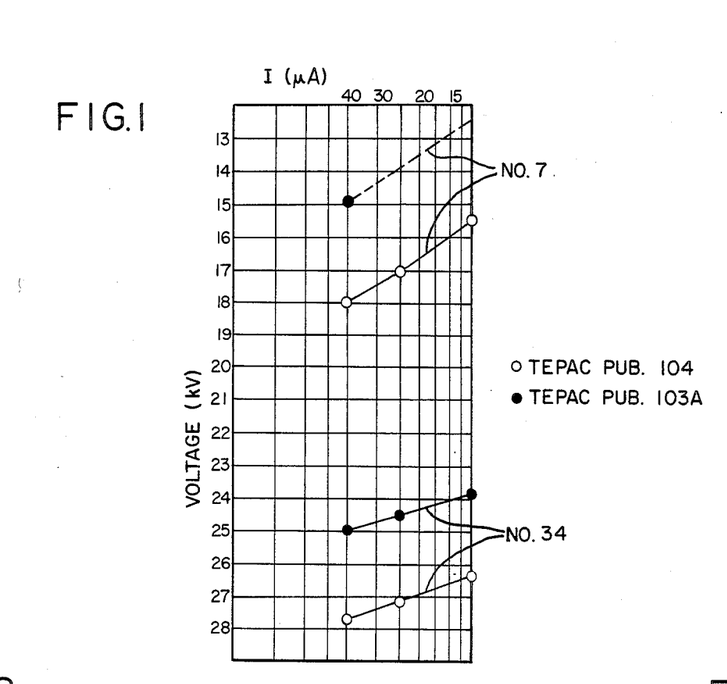
FIG. 1 is a graph showing X-radiation isoexposure curves for two ceramic materials.

This improvement is illustrated in FIG. 1 which shows X-radiation isoexposure curves for two X-ray attenuating forsteritic porcelain materials. The curves of FIG. 1 can be used to compare the X-ray attenuating ability of the ceramic material of Example 7, which includes only a small amount of ZnO for X-ray attenuation, and the composition of Example 34, which contains a preferred mixture of X-ray attenuating substances including barium oxide, strontium oxide, zirconium oxide and zinc oxide.

The curves of FIG. 1 are a plot of acceleration voltage (kV) versus microamps of anode current ($\mu$A) for an electron gun operating such that X-rays are transmitted at a rate of 0.5 mr/h through ceramic funnel material having a thickness of 0.167 inches at the point of maximum radiation exposure. Data for these curves were obtained according to test procedures formulated by the E.I.A. Tube Engineering Panel Advisory Council (TEPAC). The specific procedures used were TEPAC PUB 103A (raster-scanned) and TEPAC PUB 104 (nonraster-scanned).

The curve for the material of Example 34 shows that a cathode ray tube manufactured with a preferred funnel ceramic according to the present invention can be operated at a sufficiently high voltage to produce a bright screen image at a safe level of X-ray transmission. The curve for the material of Example 7 shows that X-ray emission safety standards can be met when only moderate amounts of ZnO are used, but that image brightness is greatly sacrificed since the tube must be operated at a reduced acceleration voltage.

Figure 2:
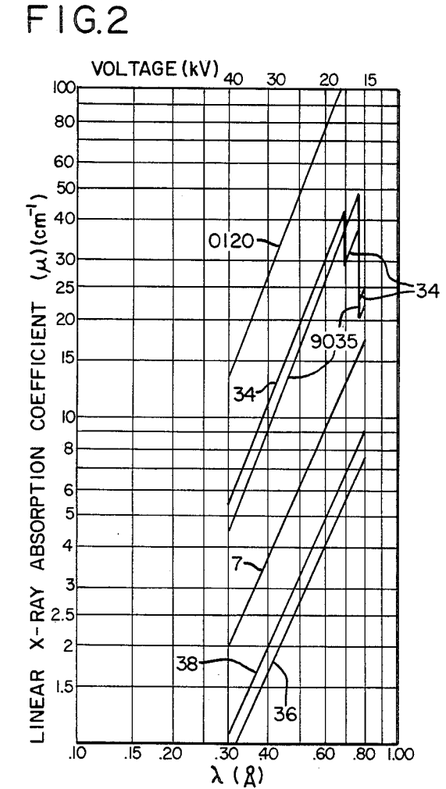
FIGS. 2 and 3 are graphs showing linear X-ray absorption curves for various ceramic and glass materials.
Figure 3:
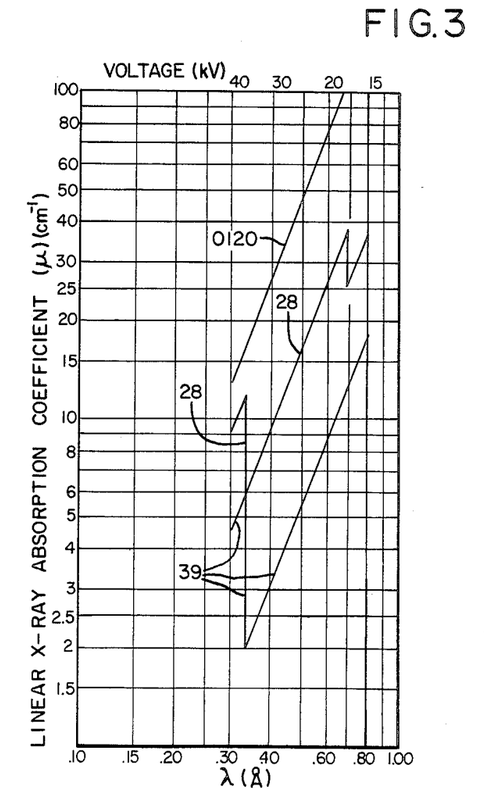

The X-ray linear absorption coefficient of a ceramic material is also affected by the acceleration voltage at which a cathode ray tube is operated. This is because electrons accelerated at higher voltage differentials produce X-radiation of a relatively short wavelength. Short wavelength X-radiation is generally more penetrating of a ceramic material than is longer wavelength X-radiation, as illustrated in the curves of FIGS. 2 and 3. In these graphs, linear absorption coefficients are plotted against X-radiation wavelengths ($\lambda$) in angstroms for various ceramic materials. Scales extending across the top of FIGS. 2 and 3 show how acceleration voltage in kilovolts corresponds with X-radiation wavelength. The graphs of FIGS. 2 and 3 are both at the same scale. Two separate figures are used for clarity to separate overlapping data. A reference curve, identified as 0120, appears in both figures.

The curves designated 0120 and 9035 show the transmissiveness of X-ray attenuating glass compositions commercially available from Corning Glass Works. In particular, the curve designated 0120 refers to Corning No. 0120 glass, used in cathode ray tube funnels. The other reference curve is for Corning No. 9035 glass which is an X-ray attenuating glass composition used for cathode ray tube faceplates.

Other curves in FIGS. 2 and 3 show the X-ray attenuating ability of various ceramic materials described in Table II. These curves are designated by reference numbers which correspond to Example numbers appearing in Tables I–III.

As shown in FIG. 2, the prior forsteritic ceramics of Examples 36 and 38 have relatively little X-ray attenuating ability. The prior ceramic of Example 39, containing 6.0 percent barium oxide, is a fair attenuator for X-radiation at wavelengths below about 0.33 angstroms, but performs poorly in absorbing lower energy X-radiation. Such lower energy X-radiation is the type most commonly emitted by cathode ray tubes that operate at relatively low voltages. Tubes of this nature are manufactured in relatively small quantities for use in certain oscilloscopes and in special purpose applications.

The curve for Example 7 shows that a forsteritic porcelain, containing 5.3 wt. percent ZnO, is a slightly better attenuator of low energy X-radiation than is the composition of Example 39. These are examples of the prior ceramic materials that have the greatest ability to absorb low energy X-radiation. In neither case is absorption sufficient that the material could be used to manufacture components of reasonable thickness for unshielded cathode ray tubes.

The importance of this invention, that forsteritic ceramic compositions can have X-ray attenuating ability comparable to that of X-ray attenuating glasses, is shown by the other curves which appear in FIGS. 2 and 3. The porcelain of Example 34, containing strontium oxide, zirconium oxide, zinc oxide and a small amount of barium oxide, and the porcelain of Example 28, containing zinc oxide with barium zirconate, both have X-ray attenuating ability superior to that of Corning 9035 glass for X-radiation over a wide range of wavelengths.

Because such ceramic materials can be formed into X-ray attenuating funnels, it is now possible to manufacture special purpose cathode ray tubes in short production runs, and at a relatively low cost. Using the most preferred formulations, the X-ray attenuating ability of such ceramic funnels is equal to or greater than that of X-ray attenuating glass components. And cathode ray tubes that incorporate the ceramic funnels will typically have a greater implosion strength than equivalent components manufactured from glass.

While we have shown and described preferred embodiments of our invention, it will be apparent to those skilled in the art, that changes and modifications may be made without departing from the invention in its broader aspects. For example, the foregoing discussion primarily concerns the use of specific forsteritic porcelains for the manufacture of cathode ray tube funnels. But, X-ray attenuating ceramic materials other than forsteritic porcelains can be made in accord with the present invention. And, ceramic materials according to this invention are useful in the manufacture of various electrical components other than the components of cathode ray tube bodies. It is therefore intended that the appended claims cover all such changes and modifications as fall within the true scope and spirit of our invention.

We claim:

1. In a cathode ray tube comprising a ceramic funnel, a glassplate sealed to the funnel, and an electron gun within the sealed tube, the improvement wherein the funnel is a rigid, nonporous body of ceramic material formed by shaping a uniformly dispersed mixture of oxides to form a greenware body and heating the greenware body to a temperature which is sufficient to cause sintering of the mixture without total melting and loss of shape, the mixture having as an essential component, 1-30 wt. percent of an X-ray attenuating substance selected from the group consisting of $SrZrO_3$, $SrCO_3$, $ZrSiO_4$ and mixtures thereof, wherein the mixture included 10-20 wt. percent $SrZrO_3$.

2. In a cathode ray tube comprising a ceramic funnel, a glass faceplate sealed to the funnel and an electron gun disposed within the sealed tube, the improvement wherein the funnel is a rigid, nonporous body of ceramic material formed by shaping a uniformly dispersed mixture of oxides to form a greenware body and heating the greenware body to a temperature which is sufficient to cause sintering of the mixture without total melting and loss of shape, the material having not more than 5 wt. percent PbO and haivng as an essential ingredient at least twenty weight percent ZnO.

3. In a process for the manufacture of a cathode ray tube comprising a ceramic funnel, a glass faceplate sealed to the funnel and an electron gun disposed within the sealed tube, the improvement wherein the funnel is made by:

providing a uniformly dispersed mixture of oxides having not more than 5 wt. percent PbO and having at least twenty wt. percent ZnO so that the ceramic material will have the property of absorbing X-rays of wave lengths of X-rays which result from operation of the gun;

shaping the mixture to form a greenware body; and heating the greenware body to a temperature sufficient to cause sintering of the mixture without total melting and loss of shape.

4. In a cathode ray tube comprising a ceramic funnel, a glass faceplate sealed to the funnel, and an electron gun disposed within the sealed tube, the improvement wherein the funnel is a rigid, nonporous body of ceramic material formed by shaping a uniformly dispersed mixture of oxides to form a greenware body and heating the greenware body to a temperature which is sufficient to cause sintering of the mixture without total melting and loss of shape, the material having by weight on the oxide basis at least 8 percent $ZrO_2$ so that the ceramic material has the property of absorbing X-rays of wave lengths of X-rays which result from operation of the gun.

5. The improvement of claim 4 wherein the ceramic material is a forsteritic ceramic material which further comprises, by weight on the oxide basis:

17-50 percent MgO;

2-20 percent $Al_2O_3$, the total of MgO plus $Al_2O_3$ being not more than 53 percent;

29-50 percent $SiO_2$; and an effective amount of an X-ray attenuating substance selected from the group consisting of BaO, SrO, $Y_2O_3$, $Nb_2O_3$, and mixtures thereof, the combined amounts of X-ray attenuating substances being not more than 30 percent.

* * * * *